(12) United States Patent
Yu et al.

(10) Patent No.: US 8,599,439 B2
(45) Date of Patent: Dec. 3, 2013

(54) LASER COLOR COPY IMAGE PROCESSING INDEPENDENT OF CLASSIFICATIONS

(75) Inventors: Shenbo Yu, Andover, MA (US); Fred W. Andree, Brookline, MA (US); Steven J. Pratt, Acton, MA (US)

(73) Assignee: CSR Imaging US, LP, Burlington, MA (US)

( * ) Notice: Subject to any disclaimer, the term of this patent is extended or adjusted under 35 U.S.C. 154(b) by 1227 days.

(21) Appl. No.: 12/234,500

(22) Filed: Sep. 19, 2008

(65) Prior Publication Data

US 2009/0161150 A1    Jun. 25, 2009

Related U.S. Application Data

(60) Provisional application No. 61/016,240, filed on Dec. 21, 2007.

(51) Int. Cl.
*G06F 3/12* (2006.01)
*H04N 1/409* (2006.01)

(52) U.S. Cl.
USPC ....... 358/3.26; 358/1.15; 358/3.04; 358/3.03; 358/3.05; 358/534; 358/536; 358/3.1; 358/3.3

(58) Field of Classification Search
USPC ............ 358/1.15, 3.26, 3.03, 3.04, 3.06, 3.23
See application file for complete search history.

(56) References Cited

U.S. PATENT DOCUMENTS

| | | | |
|---|---|---|---|
| 5,798,846 A | 8/1998 | Tretter | |
| 5,933,131 A * | 8/1999 | Rich | 345/605 |
| 5,987,221 A | 11/1999 | Bearss et al. | |
| 6,118,935 A | 9/2000 | Samworth | |
| 6,272,248 B1 * | 8/2001 | Saitoh et al. | 382/218 |
| 6,552,824 B2 | 4/2003 | Rombola et al. | |
| 6,608,701 B1 | 8/2003 | Loce et al. | |
| 6,785,416 B1 | 8/2004 | Yu et al. | |
| 6,839,151 B1 | 1/2005 | Andree et al. | |
| 2005/0094210 A1 * | 5/2005 | Damera-Venkata | 358/3.03 |

OTHER PUBLICATIONS

Zhen et al. "AM/FM Halftoning: A Method for Digital Halftoning Through Simultaneous Modulation of Dot Size and Dot Placement," School of Electrical and Computer Engineering, Purdue University, Jul. 17, 2002, 13 pgs.

* cited by examiner

*Primary Examiner* — Steven Kau
*Assistant Examiner* — Quang N Vo
(74) *Attorney, Agent, or Firm* — Frommer Lawrence & Haug LLP; John W. Branch

(57) ABSTRACT

An apparatus and a method are described for processing and reproducing a document including both text and half-tone images without generating undesirable image artifacts. A band-pass FIR filter with a predetermined frequency response is used to transform pixels in an input image to sharpen text edge and smooth pre-half-toned areas, and perform error diffusion and cluster dot screening methods on the transformed pixels. The FIR filter has unity gain at DC to preserve image brightness. An integrated error diffused cluster-dot screening approach is used to suppress moiré and other image artifacts, while providing a robust, crisp output.

20 Claims, 10 Drawing Sheets

*Frequency*

*1000A*

```
LUT8toNOut[256] = {
    0,1,1,1,1,1,1,1,1,1,1,1,1,1,1,1,
    2,2,2,2,2,2,2,2,2,2,2,2,2,2,2,2,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3,
    3,3,3,3,3,3,3,3,3,3,3,3,3,3,3,3};
```

*1000B*

ScaleNLUT[4] = {0, 85, 170, 255};

FIG. 10

LASER COLOR COPY IMAGE PROCESSING INDEPENDENT OF CLASSIFICATIONS

CROSS-REFERENCE TO RELATED APPLICATIONS

The present application claims priority to U.S. Provisional Application Ser. No. 61/016,240 entitled "Apparatus And Method For Laser Color Copy Image Processing Without Classification," filed on Dec. 21, 2007, the benefit of the earlier filing date of which is hereby claimed under 35 U.S.C. §119 (e) and 37 C.F.R. §1.78, and which is incorporated herein by reference in their entirety.

TECHNICAL FIELD

The present invention relates generally to image data processing for printers and, more particularly, but not exclusively to enabling processing of print data without performing segmentation classifications of the print data and by integrating error diffusion with cluster dot screening to provide a crisp appearance, suppress moire, and provide stability for at least laser color printing, scanning, and/or copying.

BACKGROUND

With the advent of ubiquitous computing, graphical user interface, and multimedia data exchange in business, commerce, and private use, efficient and high quality processing of visual data have become increasingly more important. Visual data include half-tone (gray-scale) images, color images, and large and small text represented in a variety of formats. Generally, visual data are displayed on a display device, such as a computer display, or other medium, such as paper, having picture elements or pixels. Density of Pixels, usually expressed as dots per inch (DPI), for example, 300 or 400 DPI, is a measure of the resolution of an image. In display applications, for example, for printing gray-scale or color text and images, it is often desirable or required (for example, because of hardware limitations in the display device or printer) to reduce the original resolution of the image without significantly adversely affecting the quality of the image. Digital scanning of a paper copy sometimes produces undesirable artifacts, such as inter-screen moire when the paper copy is printed by half-toning techniques, more fully described below. Image classification and/or segmentation may be used to first classify a type of the image to be scanned, and then select an appropriate processing technique for the particular type of image. For example, using image classification, if the image type is determined to be text, then text processing techniques, such as sharpening text edges and smoothing pre-halftoned regions may be used. Image classification techniques are computationally expensive to apply and do not always correctly identify the image type. As such, the wrong techniques may be applied to a given type of image further exacerbating image quality problems.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 10 illustrates embodiments of illust4rative LookUp Tables (LUTs) useable in the process of FIG. 5.

DETAILED DESCRIPTION

Figure 1:
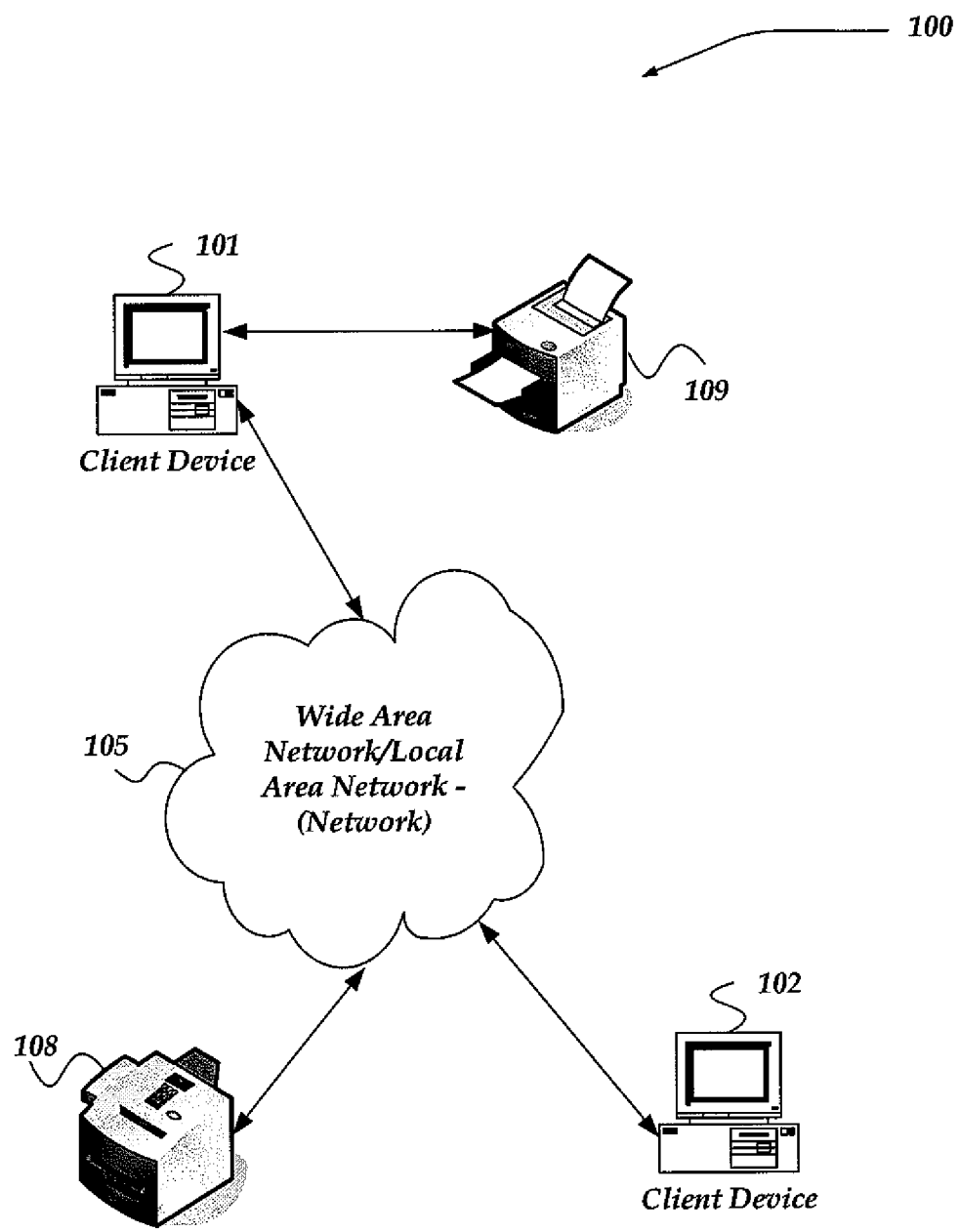
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "moiré pattern" refers to an interference pattern that is created when grid patterns are overlaid at an angle to each other. Moiré patterns are often an undesired result of images produced during various digital imaging, such as when scanning a halftone picture.

As used herein, the terms "half-tone," or "half-toning," refer to a reprographic technique that is directed towards simulating continuous tone imagery through a use of dot spacing. The term "error diffusion," refers to a type of half-toning in which a quantization residual is distributed to neighboring image pixels, which have not yet been processed. Error diffusion is a process by which a multi-level image is converted into a binary image where pixel-level error resulting from binary thresholding (i.e., difference between thresholded output pixel value and the corresponding original pixel value) is distributed among neighboring pixels, usually according to a weighted distribution scheme using a filter, to reduce per pixel error for a particular pixel, thus resulting in a smoother reproduction of original pixels.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various illustrative embodiments are described for simultaneous processing and reproducing a document including both text and half-tone images while eliminating or reducing the generation of undesirable image artifacts. A two-step process is performed including, first, using a band-pass FIR (finite impulse response) filter with a predetermined frequency response to transform pixels in an input image to sharpen text edges and smooth pre-half-toned areas, and second, using an integrated error diffused cluster-dot screening approach to perform error diffusion and cluster dot screening on the transformed pixels. The FIR filter has a unity gain at DC (direct current) to preserve image brightness. The integrated error diffused cluster-dot screening approach is used to suppress moiré, an optical interference pattern that appears when periodic patterns intersect, while providing a robust, crisp output.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, client devices 101-102; and printing devices 108-109.

One embodiment of a client device usable as one of client devices 101-102 is described in more detail below in conjunction with FIG. 3. Briefly, however, client devices 101-102 may include virtually any computing device capable of receiving and sending a message over a network. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client devices 101-102 may also include virtually any computing device that typically connects using a wired communications medium such as personal computers, multiprocessor systems, microprocessor-based or programmable consumer electronics, network PCs, or the like. In one embodiment, one or more of client devices 101-102 may also be configured to operate over a wired and/or a wireless network.

Client devices 101-102 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. However, in at least one embodiment, client devices 101-102 are configured to provide data to at least one of printing devices 108-109 for printing.

In one embodiment, client devices 101-102 may provide the print data using any of a variety of mechanisms. For example, client devices 101-102 may communicate via a page description language, a printer command language (PCL), a Postscript language, or the like. Client devices 101-102 are not constrained to these communication mechanisms and others may also be used. For example, in one embodiment, client devices 101-102 may also communicate using a graphical device interface (GDI) format, as well.

In one embodiment, as described in more detail below, client devices 101-102 may provide print data that has been processed independent of classifying the data as image data or text data. Moreover, in one embodiment, client devices 101-102 may processing the print data by integrating error diffusion with cluster dot screening, and provide the results to at least one of printing devices 108-109 for producing an output. However, the invention is not so limited, and in another embodiment, client devices 101-102 may provide the print data to one of printing devices 108-109 where the integrated error diffusion with cluster dot screening processing may be performed.

As illustrated, client devices 101-102 may communicate with printing devices 108-109 over network 105. However, the invention is not so limited. For example, in one embodiment, and as shown, a client device such as client device 101 may be directly connected to a printing device, such as printing device 109 for communication.

In any event, network 105 is configured to couple client devices 101-102 to each other, and/or to printing devices 108-109. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including, but not limited to satellite links, or other communications links known to those skilled in the art. Furthermore, remote computers and other related electronic devices could be remotely connected to either LANs or WANs via a modem and temporary telephone link.

Network 105 may also be configured to include any of a variety of wireless sub-networks that may further overlay stand-alone ad-hoc networks, or the like, to provide an infrastructure-oriented connection for client devices 101-102, and printing devices 108-109. Such sub-networks may include mesh networks, Wireless LAN (WLAN) networks, cellular networks, or the like.

Network 105 may further include an autonomous system of terminals, gateways, routers, or the like connected by wireless radio links, or the like. These connectors may be configured to move freely and randomly and organize themselves arbitrarily, such that the topology of network 105 may change rapidly.

Network 105 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 101-102, and/or printing devices 108-109 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, network 1050 may include virtually any wireless communication mechanism by which information may travel between client devices 101-102 and/or printing devices 108-109, and another computing device, network, or the like.

Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

One embodiment of printing devices 108-109 are described in more detail below. Briefly, therefore, printing devices 108-109 represent virtually any apparatus that is configured to print data onto a hardcopy format, such as paper. In one embodiment, printing devices 108-109 represent laser printing devices that are configured to employ a laser beam or similar technology to transfer print data onto a hardcopy format. It should be noted that while laser printing is described as one embodiment, the invention is not so limited, and other printing mechanism may also be employed without departing from the scope of the invention.

In one embodiment, printing devices 108-109 are configured and arranged to print data at different resolutions. However, in one embodiment, printing devices 108-109 are configured and arranged to manage resolutions at 600 dpi and above. However, the invention is not limited to resolutions of 600 dpi or above, and other resolutions may also be employed, including, but not limited to, for example, 300 dpi. Moreover, printing devices 108-109 may be configured to provide output in black and white, and/or in color. Printing devices may further be configured to print images and/or text. In one embodiment, printing devices 108-109 are configured to employ laser printing mechanisms.

Illustrative Apparatus and Network Devices

Figure 2:
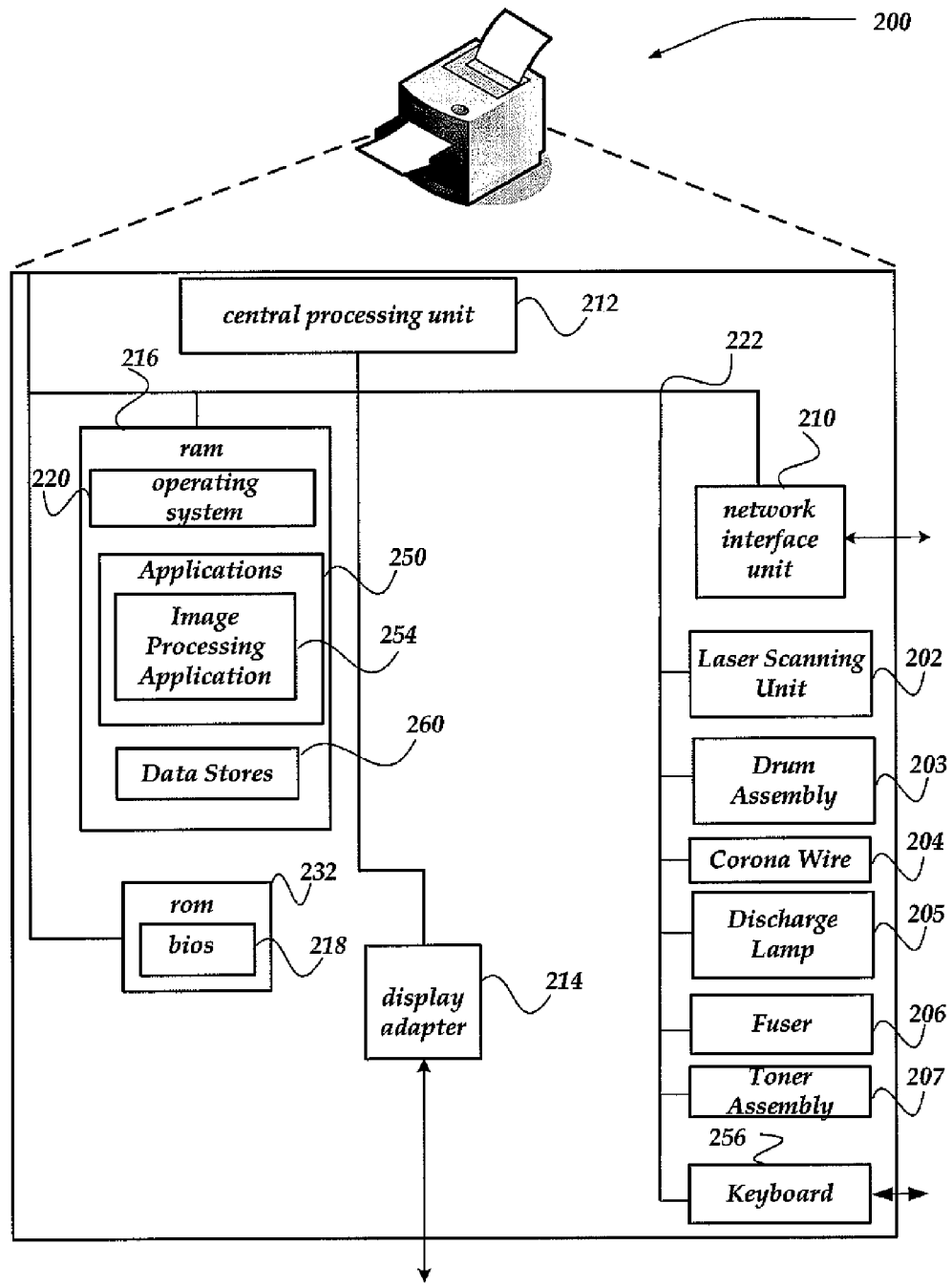
FIG. 2 shows one embodiment of a printing device that may be included in a system implementing the invention.

FIG. 2 shows one embodiment of printing device 200 that may be included in a system implementing the invention. Printing device 200 may include many more or less components than those shown in FIG. 2. However, the components shown are sufficient to disclose an illustrative embodiment for practicing the present invention. Printing device 200 may represent, for example, printing devices 108-109 of FIG. 1. As shown, printing device 200 is configured to employ laser print technology. However, the invention is not so constrained, and other print technologies may also be employed, without departing from the scope of the invention.

As shown, printing device 200 includes processing unit 212, video display adapter 214, and a mass memory, all in communication with each other via bus 222. The mass memory generally includes RAM 216, and ROM 232. The mass memory may store operating system 220 for controlling the operation of printing device 200. Any general-purpose printing oriented operating system may be employed. Basic input/output system ("BIOS") 218 is also provided for controlling the low-level operation of printing device 200, such as startup, diagnostics, and the like. As illustrated in FIG. 2, printing device 200 also can communicate with the Internet, or some other communications network, via network interface unit 210, which is constructed for use with various communication protocols including the Wi-Fi, Bluetooth, infrared, or the like. Communications may also be over a universal serial port (USB); a parallel port; a serial bus such as RS-232 Recommended Standard 232), ANSI/TIA/EIA-422, or the like; IEEE 1394 (e.g., Firewire); or the like. Network interface unit 210 is sometimes known as a transceiver, transceiving device, or network interface card (NIC).

Keypad 256 may comprise any input device arranged to receive input from a user. For example, keypad 256 may include a push button numeric dial, or a keyboard. Keypad 256 may also include command buttons that are associated with selecting and sending images.

Display adapter 214 is arranged to interface with any of a variety of display devices, including, but not limited to a liquid crystal display (LCD), gas plasma, light emitting diode (LED), or any other type of display used with a computing device. Display adapter 214 may also interfaced to a touch sensitive screen arranged to receive input from an object such as a stylus or a digit from a human hand.

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example data stores 260 may be configured to store printer commands, diagnostics, user preferences, as well as font information, and/or data to be printed.

One or more applications 250 are loaded into mass memory and run on operating system 220. Although applications 250 are illustrated in ram 216, the invention is not so limited. For example, one or more of applications 250 may also be loaded into rom 232, without departing from the invention. As illustrated, one embodiment of applications 250 includes Image processing application 254 which may be configured and arranged, at least in part, to receive print data and process the print data independent of performing a classification. Moreover, image processing application 254 may in one embodiment, perform integrated error diffusion, and cluster dot screening in preparing the data for printing. In one embodiment, image processing application 254 may employ a process substantially similar to the processes described below in conjunction with FIGS. 4-5 to perform at least some of its actions. In another embodiment, image processing application 254 may receive the print data with integrated error diffusion and cluster dot screening already performed by another computing device, such as one or more of client device 101-102 of FIG. 1.

Printing device 200 may also include a drum assembly 203, or photoreceptor. In one embodiment, drum assembly 203 is configured to revolve, and may be made of any of a variety of photoconductive materials. Drum assembly 203 may be given an electric charge by corona wire 204. Corona wire 204 may represent a charged roller, rather than a wire. In any event, as the drum rotates, laser scanning unit 202 directs a laser beam across drum assembly 203's surface based on the data to be printed. Toner assembly 207 provides toner, such as a powder, onto drum assembly 203. Corona wire 204, or the like, may further provide a charge to paper or other print material, which may then be moved over drum assembly 203. The paper or other print material may then pass through fuser 206 such that the applied toner is heated or otherwise caused to adhere to the paper or other print material. Upon depositing toner to the paper or other print material, the surface of the drum of drum assembly 203 may pass discharge lamp 205 where a light, or the like, may expose the drum to erase or remove the electrical image. In one embodiment, the drum surface of drum assembly 203 may then pass corona wire 204, which may then reapply a charge. It should be noted that the invention is not limited to this method of transferring data onto a print material, and other mechanisms may also be used. Thus, the invention is not to be constrained or otherwise narrowed by this embodiment.

Figure 3:
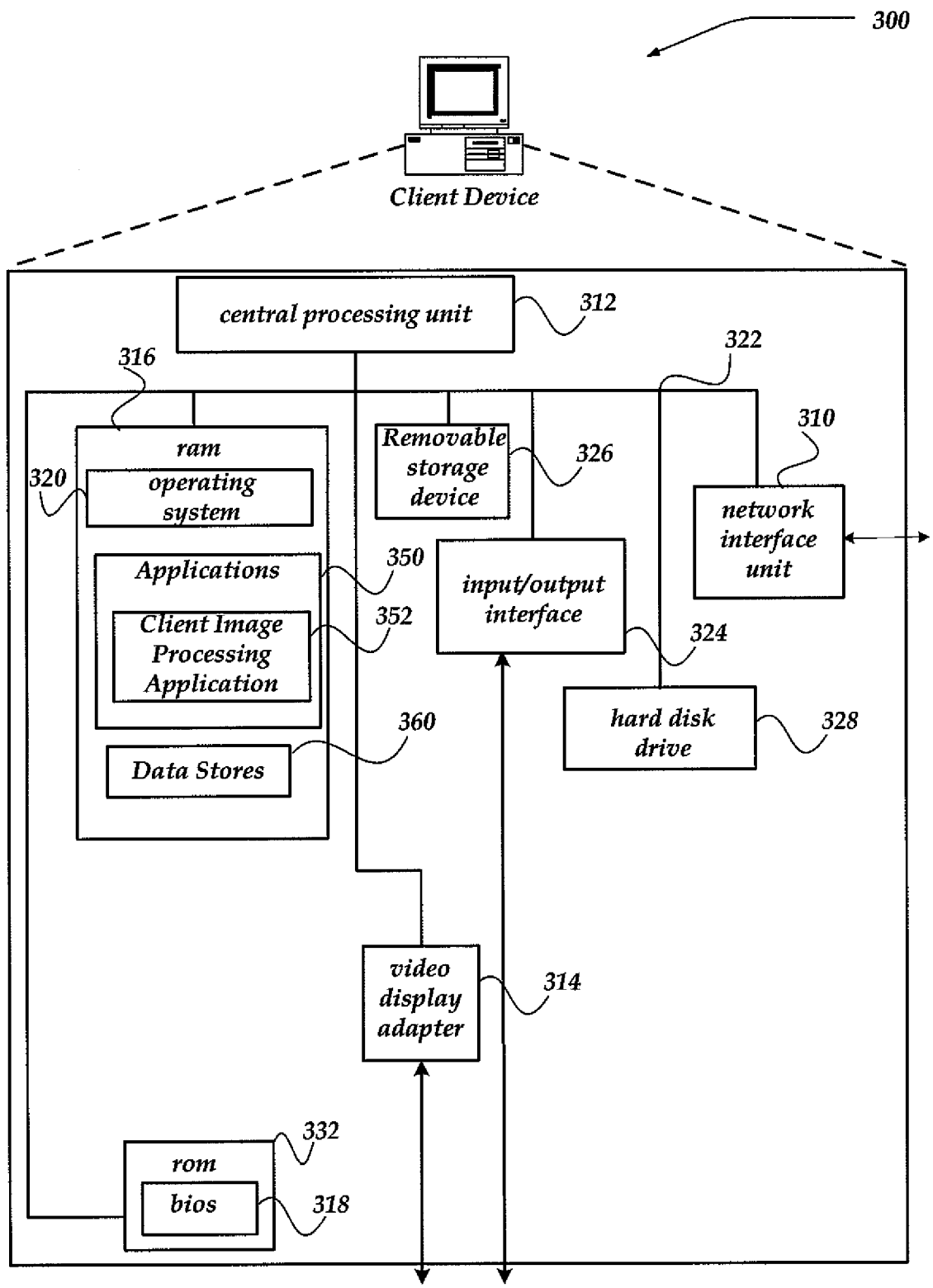
FIG. 3 shows one embodiment of a client device that may be included in a system implementing the invention.

FIG. 3 shows one embodiment of a client device 300, according to one embodiment of the invention. Client device 300 may include many more components than those shown. The components shown, however, are sufficient to disclose an illustrative embodiment for practicing the invention. Client device 300 may represent, for example, client devices 101-102 of FIG. 1.

Client device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of client device 300. Any general-purpose operating system may be employed. Basic input/output system ("BIOS") 318 is also provided for controlling the low-level operation of client device 300. As illustrated in FIG. 3, client device 300 also can communicate with the Internet, or some other communications network, via network interface unit 310, which is constructed for use with various communication protocols including the TCP/IP protocol, Wi-Fi, Zigbee, WCDMA, HSDPA, Bluetooth, WEDGE, EDGE, UMTS, infrared, or the like. Network interface unit 310 is sometimes known as a transceiver, transceiving device, or network interface card (NIC). Client device 300 may also communicate with a printing device over Firewire, a serial port, a parallel port, USB, wireless, or the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message clients, IM message clients, email clients, account management and so forth. Applications 350 may also include client Image Processing Application (CIPA) 352, and data stores 360.

Data stores 360 may be include virtually any mechanism usable for store and managing data, including but not limited to a file, a folder, a document, or an application, such as a database, spreadsheet, or the like. Data stores 360 may manage information that might include, but is not limited to user preferences, messaging data, text, images, and/or other types of data for printing and/or display. At least some of the information storable in data stores 360 may also be stored in part or completely in another storage media, including, for example, removable storage device 326, hard disk drive 328, or the like.

CIPA 352 is configured and arranged to process data for printing independent of performing a classification on the data to determine whether the data is text data or image data. CIPA 352 may receive the data and submit the data to an auto filter such as described below. CIPA 352 may then perform an integrated screening and error diffusion process upon the resulting data to process both halftone image regions and text regions, and perform smoothing of halftoned regions, while sharpening regions with text images. Such processing is directed towards resisting generation of moiré. CIPA 352 may employ a process described in more detail below in conjunction with FIGS. 4-5. Moreover, as noted above, in one embodiment, CIPA 352 may provide data for printing to a printing device which is configured and arranged to instead perform processes 400 and/or 500 of FIGS. 4-5.

Generalized Operation

It will be understood that each block of the illustrative flowcharts described below, and combinations of blocks in the flowcharts, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

As an image is received for processing, for example, by using a scanner, a camera, or other input mechanism to optically sample a document, individual pixels are created in computer memory representing the visual characteristics of corresponding points on the image. The visual characteristics are generally represented by a value for each of the pixels. In color images, each pixel may be represented by multiple components, for example, a red (R) component, a green (G) component, and a blue (B) component, to form an RGB representation of color. Those skilled in the art will appreciate that other forms of color representation such as HIS (hue, intensity, saturation), YLN, YIQ, YCbCr, etc. may also be used at some point in image processing. Some of these alternative representations are based on luma (related to light intensity and grey level) and chroma (related to hue and saturation of color) components.

Figure 4:
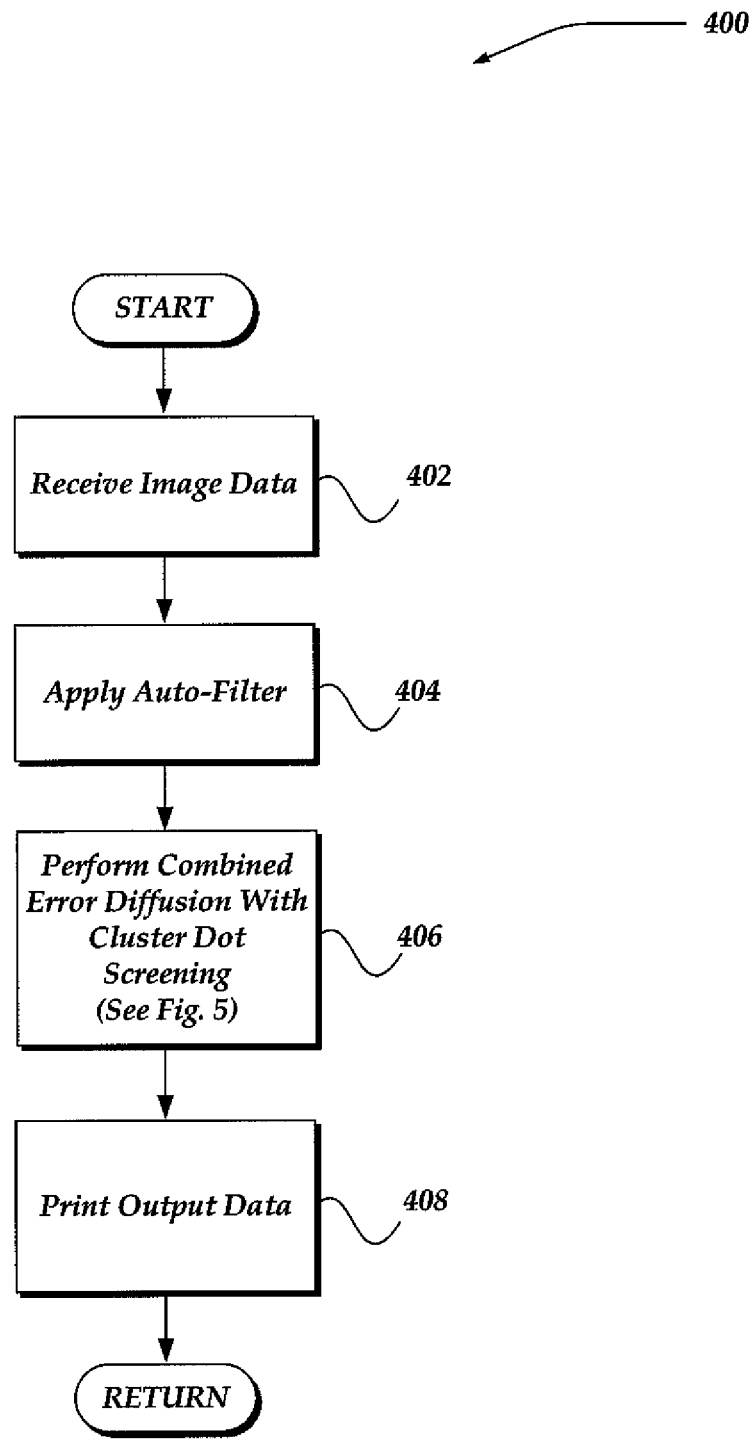
FIG. 4 illustrates a logical flow diagram generally showing one embodiment of a process for managing image processing independent of classifications.

The operation of certain aspects of the invention will now be described with respect to FIGS. 4-10. FIG. 4 illustrates a logical flow diagram generally showing one illustrative embodiment of a process for managing image processing independent of classifications. At block 402 an image is received as described above. At block 404 a FIR bandpass filter is applied to the image. In one illustrative embodiment, the FIR bandpass filter is a matrix of numbers, for example a 7×7 matrix, applied to a same size grid of pixels.

Figure 6:
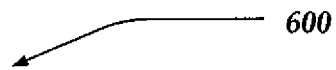
FIG. 6 illustrates a block diagram of one embodiment of an auto-filter useable by the illustrative embodiment.

One illustrative embodiment of the filter matrix is shown in FIG. 6, more fully described below. The coefficients of the color filter are designed to sharpen text edges and smooth pre-half-toned areas in the image. This filter operates based on the frequency components in the image. Sharp color changes or edges encountered in an image, such as those encountered in individual letters in a word of text, have high frequency components that respond to a bandpass filter designed for passing high frequency components. In contrast, gradual color or shape changes, such as those encountered in pictures, have low frequency components that are passed through by low frequency bandpass filters. In such low frequency portions of an image, graphic artifacts such as random dots not belonging to the image are high frequency components that are effectively filtered out by the bandpass filter. In one embodiment, the 7×7 filter matrix may be employed for 600 dpi (dots per inch) image resolutions. Those skilled in the relevant arts will appreciate that other size filter matrices may be employed, as well as other resolutions without departing from the spirit of the present disclosure. Thus, for example, the 7×7 filter matrix may be applied to 300 dpi or lower (or even higher) images. Moreover, in another embodiment, a 5×5 filter matrix may also be used, without departing from the scope of the invention. A similar FIR filter is described in U.S. Pat. No. 6,785,416 for image segmentation and classification, the disclosure of which in its entirety is incorporated herein by reference.

At block 406 the integrated error diffused cluster dot screening approach is performed on the image after applying the FIR filter. Error diffusion is a half-toning technique that divides the quantization error among neighboring pixels. Error diffusion is an area or neighborhood operation (as opposed to a pixel level or point operation) for generating half-tone images. In error diffusion, each input pixel in the image is traversed sequentially and compared to a half-tone threshold. This is a quantization process where if the pixel value is higher that the half-tone threshold, the value of a corresponding output pixel is set to a maximum level, such as 255 in an 8-bit word representing the value of the output pixel. Otherwise, the value of the output pixel is set to a minimum level, such as 0 (zero). Next, the difference between the input pixel and the output pixel, that is, the quantization error resulting from thresholding, is calculated and dispersed among neighboring pixels, usually according to an error filter. In one illustrative embodiment, the error filter coefficients define weights used for weighted distribution of the quantization error among the neighboring pixels not already processed. Error diffusion generally results in higher quality results and eliminates or substantially reduces image artifacts from the output image. Error diffusion also suppresses moiré and provides good reproduction of fine details. However, error diffusion may result in wavy textures in highlights and shadows and create regular pattern artifacts in some grey levels.

Cluster dot screening is an amplitude modulation (AM) based method of thresholding for producing half-tone images, where the size (analogous to amplitude) of the dots in the half-toned image vary while the distance between the dots stays fixed. In cluster dot screening the averaging property of human vision is used to see grey level where clusters of black dots of varying sizes or spacing are viewed at a distance. The bigger the dots, the darker the grey color that is perceived by the human eye, and vice versa. Cluster dot screening is somewhat vulnerable to moiré patterns.

The combination of the error diffusion and cluster dot screening, that is, the integrated error diffused cluster dot screening, results in a higher quality output image substantially free from moiré and other regular pattern artifacts while reproducing fine details in the output image. Generally, in this approach, the diffused error term is added to the input data value and then compared to a threshold in cluster dot screening. This approach is further described below with respect to an illustrative flowchart depicted in FIG. 5. At block 408 the resulting image, including the output pixels processed as described above, is printed.

Figure 5:
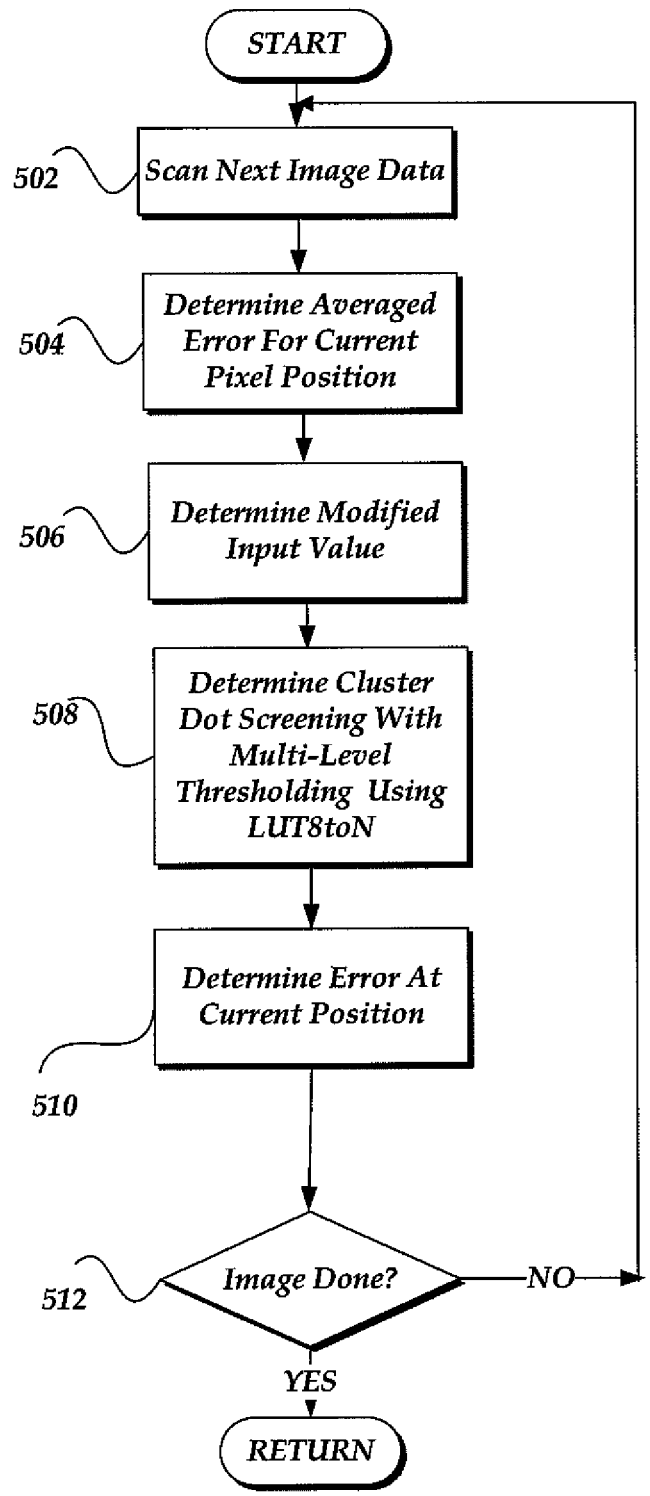
FIG. 5 illustrates a logical flow diagram generally showing one embodiment of a process for performing integrated error diffusion with cluster dot screening.

FIG. 5 is an illustrative flowchart showing the details of the process of block 406 of FIG. 4. In one illustrative embodiment, the input image data is obtained at block 502. The input image data may include a portion of the whole document image to be reproduced and/or printed. At block 504, an averaging filter is applied to each input pixel at a current position [i, j] in a neighborhood of eight pixels, where "i" and "j" represent dimensions of the image in a Cartesian reference frame, resulting in:

Averaging_filter={⅛, ⅛, ⅛, ⅛, ⅛, ⅛, ⅛, ⅛}

Average_error=(err($i$+1,$j$−1)+err($i$+2,$j$−)+err($i$+3,$j$)+ err($i$+4,$j$−1)+err($i$−3,$j$)+err($i$−2,$j$)+err($i$−1,$j$)+ err($i$,$j$))/8

Next, at block 506 the average error is added to the input pixel value to obtain a new and modified input pixel value:

New_input_pixel[$i$,$j$]=Input_pixel[$i$,$j$]+Average_error

The New_input_pixel is used in cluster dot screening process. At block 508, for a generalized multi-level screening scheme, in one illustrative embodiment, a 2-stage look up table (LUT) is used. In this embodiment, the difference between the new input pixel and the half-tone threshold value at the current position [i,j] is obtained:

Delta=New_input_pixel[$i$,$j$]−Halftone_threshold[$i$,$j$]

Next, the output pixel value is calculated using the LUT as shown in the following pseudo-code segment:

```
if (Delta < 0)
{
    Output_pixel[i,j] = 0;
}else{
    Output_pixel[i,j] = LUT8toNOut(Delta);
}
```

Where LUT8toNOut( ) is a function based on a LUT used to convert the 8-bit Delta value to an output pixel value with bit depth of 1, 2, 4, . . . , N and an output value of 1, 2, and 4. An illustrative LUIT is shown in FIG. 10.

Next, at block 510, the error at the current pixel position [i,j] is computed:

Error[i,j]=New_put_pixel[i,j]–ScaleNLUT[Output_pixel[i,j]]

Where ScaleNLUT is a table used for scaling the N-bit Output_pixel[i,j] to a corresponding 8-bit value. The integrated error diffused cluster dot method is applied to a portion of the document image, which is less than the whole document image. As such, the processing is iterative. Accordingly, at block 512, the method determines whether the document image processing is completed or portions of the document image still remain to be processed. If more image data remain to be processed, the method proceeds back to block 502 and repeats the above process for the next image data. Otherwise, the process terminates if performed independently, or returns to a calling process, such as the process 400 of FIG. 4, if called by another process as a subroutine.

An integral part of the approach above is the application of the FIR bandpass filter shown in FIG. 6. In this illustrative embodiment, a 7×7 matrix of digital filter coefficients is shown. The filter is applied iteratively to the whole image by sliding the 7×7 filter matrix over a corresponding 7×7 pixel grid of the image to be filtered until all pixels in the image are filtered. Each pixel value in the 7×7 pixel grid of the image is multiplied by the corresponding filter coefficient of the 7×7 filter matrix to obtain a new value for the image pixel. During each iteration of the application of the 7×7 filter matrix, the pixel at the current position [i, j] is positioned at the center of the 7×7 filter matrix. In the 7×7 filter matrix, the center position corresponds to the intersection of the fourth row and fourth column counting from any of the filter matrix's corners.

Figure 7:
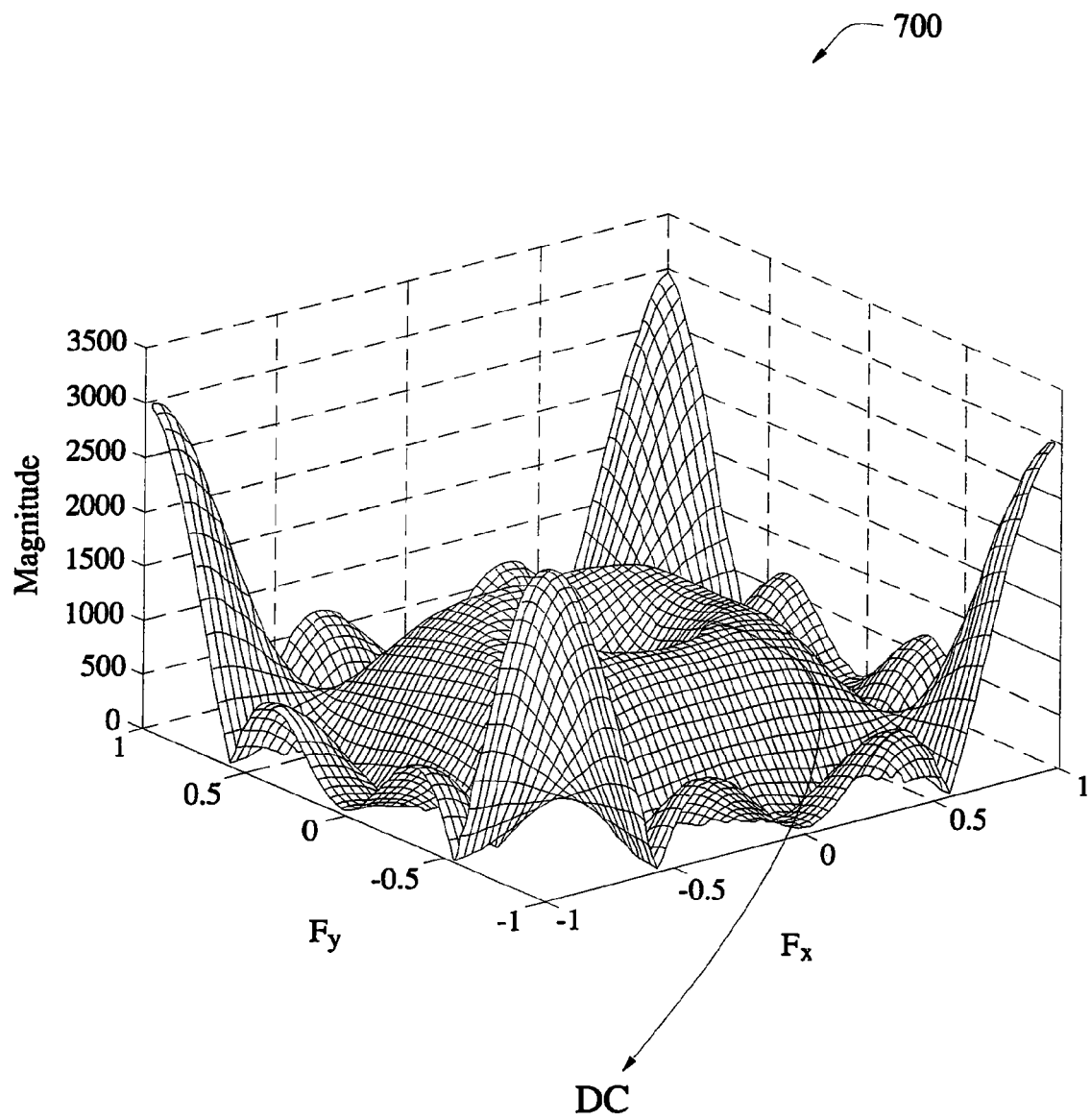
FIG. 7 illustrates one embodiment of a frequency response for the auto-filter of FIG. 6.

The coefficients of the filter matrix are designed to generate a particular frequency response from the FIR filter as shown in FIG. 7. This filter is designed to simultaneously sharpen as well as smooth an input image having both high and low frequency components. The FIR filter can sharpen and smooth an image simultaneously by having high and low frequency bands, respectively, positioned appropriately in its two dimensional frequency response curve, as shown in FIG. 7. The sharpening component of the FIR filter is applied in the luminance channel, while the smoothing component of the FIR filter is applied in the chrominance channel The high frequency components of the document image that are associated with abrupt transitions, for example, edges of letters in text, are passed through and sharpened by the application of this FIR filter. As a bandpass filter, the FIR filter selectively allows the high frequency components to pass through from the input image to the output image while blocking the passage of low frequency components such as smudges. Similarly, the FIR filter selectively allows low frequency components, for examples, pictures with gradual transitions of shades and colors, to pass through from the input image to the output image while blocking the passage of the high frequency components, such as random dots and other graphical artifacts. The selectivity of the FIR filter can be best understood with respect to FIGS. 8 and 9 described below.

Some of the characteristics of the FIR filter include unit gain at DC to preserve the image brightness. Traversing the positive frequency spectrum in X and Y dimensions of a two-dimensional image, starting at the low-frequency/DC band, shown at the center of the two dimensional frequency response curve of FIG. 7, the frequencies $F_x$ and $F_y$ shown in the figure, for the two dimensions of the image, are approximately zero, indicating very low frequency. At this point, the filter shows a dip or a well in the center, indicating an attenuated response of a high pass filter to low frequencies. This component of the FIR filter is applied to the luminance channel and allows high frequencies to pass through while blocking low frequencies, i.e., DC, as shown. Moving up the positive frequency axis (upper right quadrant, away from the labeled axis, of the X-Y plane in the two dimensional frequency response curve of FIG. 7), a mid-frequency high-pass filter component allows low to mid-band frequencies to pass through while blocking higher frequencies. Moving still higher up the positive frequency axis, a high-pass component allows high frequencies to pass through while blocking low frequencies. The low pass filter components are generally applied in the chrominance channel for smoothing.

Figure 8:
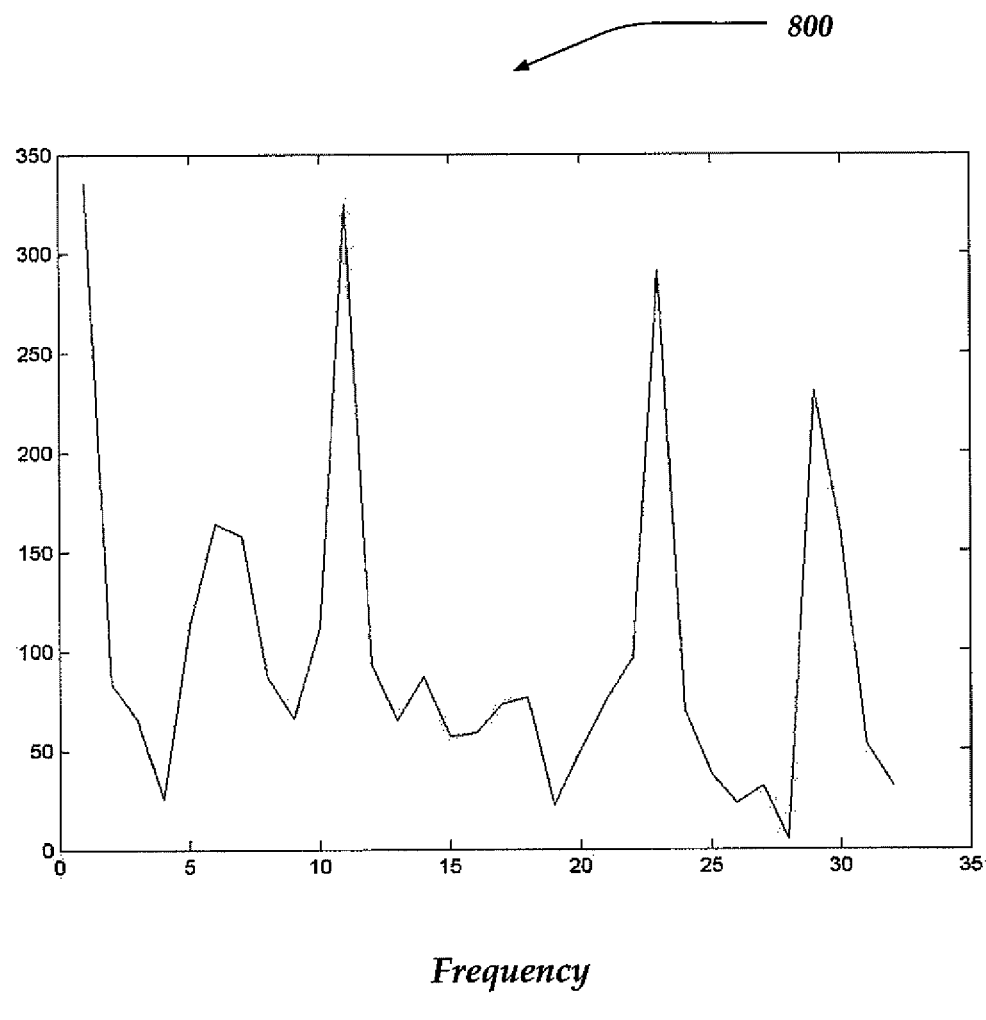
FIG. 8 illustrates one embodiment of an illustrative color half-toned image Fourier frequency response from the auto-filter of FIG. 6.
Figure 9:
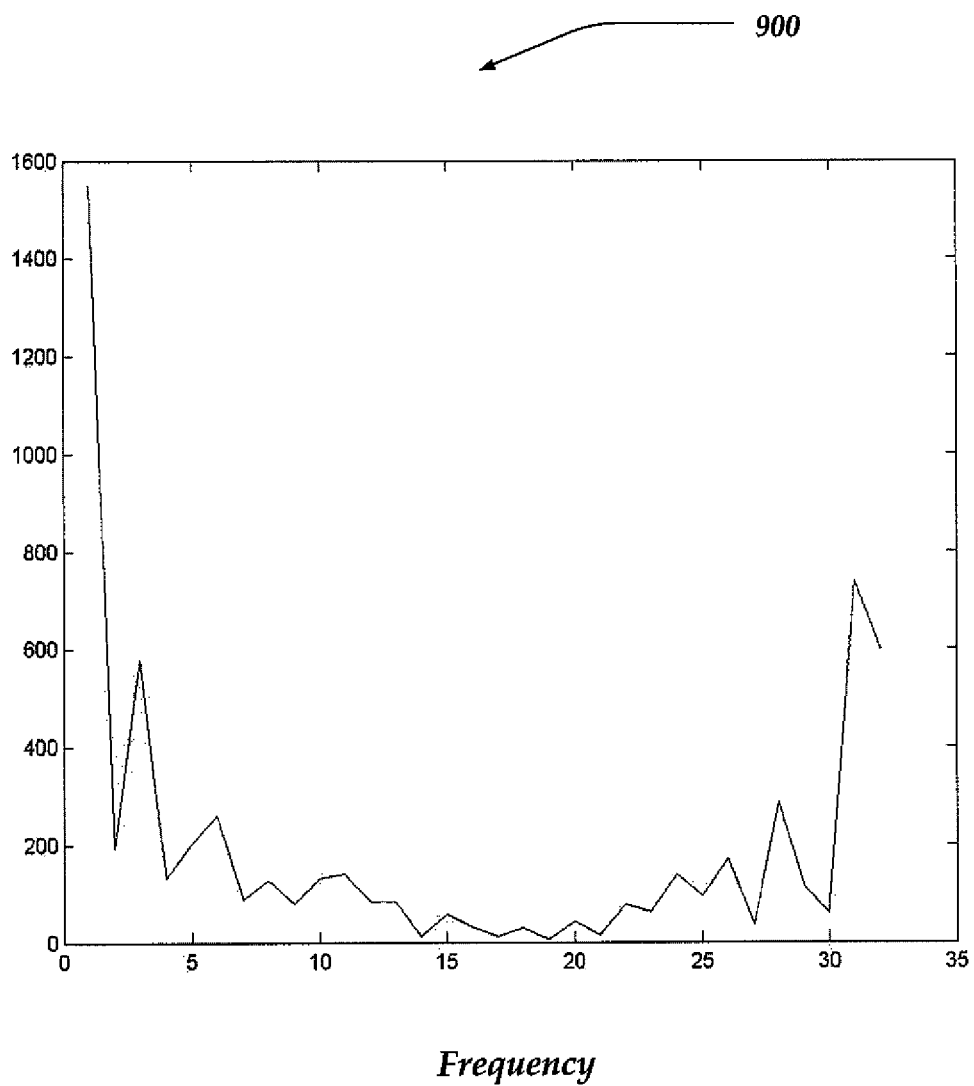
FIG. 9 illustrates one embodiment of an illustrative text image Fourier frequency response from the auto-filter of FIG. 7.

The selectivity of the FIR filter is based on certain characteristics of half-toned images and text images. FIG. 8 is a one dimensional frequency response of a half-toned color image. In the half-toned color image, there are frequency components spread along the horizontal frequency axis. These image frequency components occur at low, medium, and high frequency values, corresponding to the band-pass filter components described above. The half-toned color image frequency components are in contrast with the frequency components of a text image shown in FIG. 9, where the frequency components are at the lowest frequencies, corresponding to the center of text fonts, and at the highest frequencies, corresponding to the edges of the fonts. It is with respect to these distinct characteristics of the frequencies in picture versus text images that the FIR filter is designed. As noted above, starting from the center of the two dimensional frequency response curve of the FIR filter, the DC portion, a high pass filter (for sharpening) blocks low frequencies. Further away from the center, the FIR filter is like a box which is a low pass filter (for smoothing) and blocks high frequencies. And further away from the center, the FIR filter is again a high pass filter for sharpening edges. This way, the FIR filter's frequency response makes it possible to simultaneously sharpen and smooth an image.

FIG. 10 shows an illustrative embodiment of the LUT8toNout 1000A and ScaleNLUT 1000B tables used in the cluster dot processing described above with reference to FIG. 5. The LUT8toNout table is used to set the value of the output pixel, Output_pixel[i,j]. In the illustrative example shown in FIG. 10, the LUT8toNout table has 256 entries, linearly addressable via an index variable. The table entry values in this table include 0, 1, 2, and 3. In this example, the index variable used may take on any value from 0 to 255 for accessing any of the 256 table entries. With reference to FIG. 5 and the respective descriptions above, the index variable may be Delta, the difference between the new input pixel value, New_input_pixel, and the half-tone threshold, Halftone_threshold, also taking on values between 0 and 255. The entries to the LUT8toNout table may further be used as index value to the ScaleNLUT table. In this example, the ScaleN-LUT table has four entries, indexed as 0, 1, 2, and 3. Thus, any of the entries of the LUT8toNout table, used as an index into ScaleNLUT table, map to one of the four entries of the ScaleNLUT table. This indirect table lookup scheme using these two tables provides flexibility for computing errors and applying the multilevel screening, as described above with respect to FIG. 5.

Those skilled in the art will appreciate that any constants used in the illustrative example above, such as 0, 1, 2, 3, 4, 8, etc., are for illustration purposes only and are non-limiting. Other constants and/or variables may be used, as appropriate, without departing from the spirit of the present disclosure.

What is claimed as new and desired to be protected by Letters Patent of the United States is:

1. A computer-readable non-transitive storage medium that includes data and instructions, wherein the execution of the instructions on a computing device provides for processing of image data by performing actions comprising:
    applying a band-pass filter to simultaneously sharpen and smooth an image with a plurality of input pixels, the image having low and high frequency components, the band-pass filter having a two-dimensional frequency response curve and includes a low-frequency high-pass sharpening component, a mid-frequency low-pass smoothing component, and a high-frequency high-pass sharpening component, wherein the band-pass filter is operative to provide unity gain at direct current (DC) to preserve brightness of the image data and to apply the sharpening component to a luminance channel of the image and the smoothing component to a chrominance channel of the image;
    applying an averaging filter to calculate an average error for each of the plurality of input pixels;
    adding the average error of each of the plurality of input pixels to a value of each of the input pixels to obtain a corresponding new input pixel value;
    using a 2-stage lookup table to determine output pixels corresponding to each of the plurality of input pixels; and
    printing the output pixels.

2. The computer-readable non-transitive storage medium of claim 1, wherein the band-pass filter comprises an FIR band-pass filter.

3. The computer-readable non-transitive storage medium of claim 2, wherein the band-pass filter comprises a 7×7 matrix.

4. The computer-readable storage non-transitive medium of claim 1, wherein the image comprises text and picture.

5. The computer-readable non-transitive storage medium of claim 4, further comprising calculating a difference between the new input pixel value and half-tone threshold value and using the difference as an index to the 2-stage lookup table.

6. The computer-readable non-transitive storage medium of claim 1, wherein a difference between the new input pixel value and a half-tone threshold value is used to determine the value of the output pixels.

7. A method for managing image data processing, comprising:
    applying a band-pass filter to simultaneously sharpen and smooth an image with a plurality of input pixels, the image having low and high frequency components, the band-pass filter having a two-dimensional frequency response curve and includes a low-frequency high-pass sharpening component, a mid-frequency low-pass smoothing component, and a high-frequency high-pass sharpening component, wherein the band-pass filter is operative to provide unity gain at direct current (DC) to preserve brightness of image data and to apply the sharpening component to a luminance channel of the image and the smoothing component to a chrominance channel of the image;
    applying an averaging filter to calculate an average error for each of the plurality of input pixels;
    adding the average error of each of the plurality of input pixels to a value of each of the input pixels to obtain a corresponding new input pixel value;
    calculating the difference between the new input pixel value and a half-tone threshold value for each of the plurality of input pixels;
    using the difference between the new input pixel value and the halftone threshold value as an index into a 2-stage lookup table to determine output pixels corresponding to each of the plurality of input pixels; and
    printing the output pixels.

8. The method of claim 7, wherein the band-pass filter comprises an FIR band-pass filter.

9. The method of claim 7, wherein the band-pass filter comprises a 7×7 matrix.

10. The method of claim 7, wherein the image comprises text and picture.

11. The method of claim 7, further comprising calculating an error value for each of the plurality of input pixels based on the corresponding new input pixel values.

12. A network device to manage processing of image data, the network device comprising:
    a transceiver to send and receive data over a network; and
    a processor that is operative to perform actions comprising:
        applying a band-pass filter to simultaneously sharpen and smooth an image with a plurality of input pixels, the image having low and high frequency components, the band-pass filter having a two-dimensional frequency response curve and includes a low-frequency high-pass sharpening component, a mid-frequency low-pass smoothing component, and a high-frequency high-pass sharpening component, wherein the band-pass filter is operative to provide unity gain at direct current (DC) to preserve brightness of image data and to apply the sharpening component to a luminance channel of the image and the smoothing component to a chrominance channel of the image;
        applying an averaging filter to calculate an average error for each of the plurality of input pixels;
        adding the average error of each of the plurality of input pixels to a value of each of the input pixels to obtain a corresponding new input pixel value;
        calculating the difference between the new input pixel value and a half-tone threshold value for each of the plurality of input pixels;
        using the difference between the new input pixel value and the half-tone threshold value as an index into a 2-stage lookup table to determine output pixels corresponding to each of the plurality of input pixels; and
        printing the output pixels.

13. The network device of claim 12, wherein the band-pass filter comprises an FIR band-pass filter.

14. The network device of claim 12, wherein the band-pass filter comprises at least one of a 7×7 matrix or a 5×5 matrix.

15. The network device of claim 12, wherein the image comprises text and picture.

16. The network device of claim 12, further comprising calculating an error value for each of the plurality of input pixels based on the corresponding new input pixel values.

17. An apparatus useable to process image data for printing, comprising:
a memory arranged to store data and instructions;
an input interface for receiving the image data; and
a processor arranged to perform actions embodied by at least a portion of the stored instructions, the actions comprising:
applying a band-pass filter to simultaneously sharpen and smooth an image with a plurality of input pixels, the image having low and high frequency components, the band-pass filter having a two-dimensional frequency response curve and includes a low-frequency high-pass sharpening component, a mid-frequency low-pass smoothing component, and a high-frequency high-pass sharpening component, wherein the band-pass filter is operative to provide unity gain at direct current (DC) to preserve brightness of image data and to apply the sharpening component to a luminance channel of the image and the smoothing component to a chrominance channel of the image;
applying an averaging filter to calculate an average error for each of the plurality of input pixels;
adding the average error of each of the plurality of input pixels to a value of each of the input pixels to obtain a corresponding new input pixel value;
calculating the difference between the new input pixel value and a half-tone threshold value for each of the plurality of input pixels;
using the difference between the new input pixel value and the half-tone threshold value as an index into a 2-stage lookup table to determine output pixels corresponding to each of the plurality of input pixels; and
printing the output pixels.

18. The apparatus of claim 17, wherein the band-pass filter comprises an FIR band-pass filter.

19. The apparatus of claim 17, wherein the band-pass filter comprises at least one of a 7×7 matrix or a 5×5 matrix.

20. The apparatus of claim 17, wherein the image comprises text and picture.

\* \* \* \* \*

UNITED STATES PATENT AND TRADEMARK OFFICE
CERTIFICATE OF CORRECTION

PATENT NO. : 8,599,439 B2
APPLICATION NO. : 12/234500
DATED : December 3, 2013
INVENTOR(S) : Yu et al.

Page 1 of 2

It is certified that error appears in the above-identified patent and that said Letters Patent is hereby corrected as shown below:

In the Specification

Column 1, Line 21, delete "moire," and insert -- moiré, --, therefor.

Column 1, Line 43, delete "moire" and insert -- moiré --, therefor.

Column 6, Line 17, delete "Recommended" and insert -- (Recommended --, therefor.

Column 8, Line 14, delete "client" and insert -- Client --, therefor.

Column 9, Line 20, delete "YLN," and insert -- YUV, --, therefor.

Column 10, Line 53, delete "Average_error=(err($i+1,j-1$)+err($i+2,j-$)+err($i+3,j$)+" and insert -- Average_error = (err(i+1, j-1) + err(i+2, j-1) + err(i+3, j-1)+ --, therefor.

Column 11, Line 15, delete "LUIT" and insert -- LUT --, therefor.

Column 11, Line 19, delete "Error[$i,j$]=New_put_pixel[$i,j$]–" and insert -- Error[i,j] = New_input_pixel[i,j] – --, therefor.

Column 11, Line 59, delete "channel" and insert -- channel. --, therefor.

In the Claims

Column 13, Line 43, in Claim 2, delete "hand-pass" and insert -- band-pass --, therefor.

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,599,439 B2

Column 13, Line 52, in Claim 5, delete "and" and insert -- and a --, therefor.

Column 13, Line 64, in Claim 7, delete "hand-pass" and insert -- band-pass --, therefor.

Column 14, Line 16, in Claim 7, delete "halftone" and insert -- half-tone --, therefor.